Feb. 3, 1942.    C. L. NEWPORT ET AL    2,271,871
SOUND ABSORBING UNIT
Filed Feb. 13, 1939    2 Sheets-Sheet 1

INVENTORS
Charles B. Newport
Hubert C. Smith

Feb. 3, 1942.                C. L. NEWPORT ET AL                2,271,871
                              SOUND ABSORBING UNIT
                      Filed Feb. 13, 1939        2 Sheets-Sheet 2
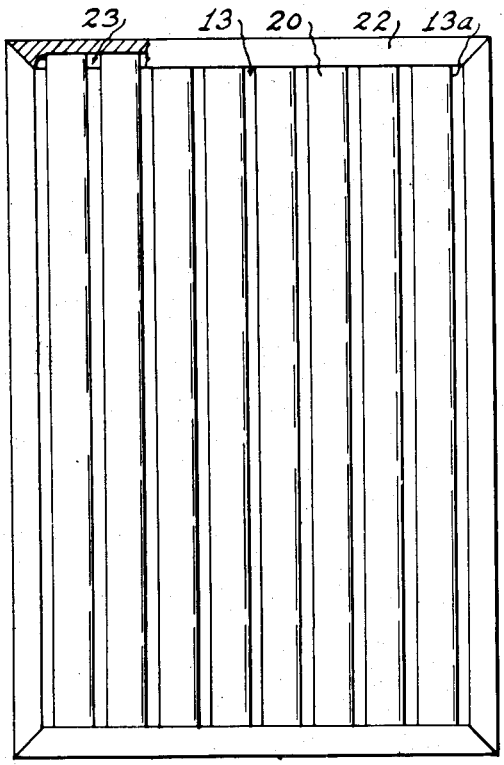
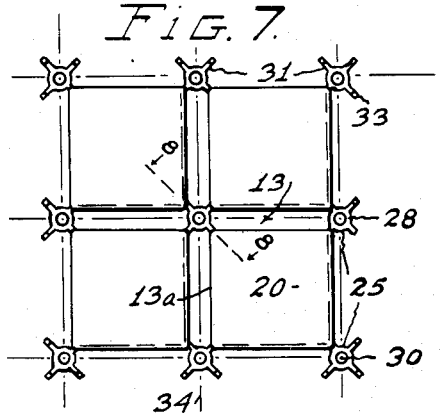
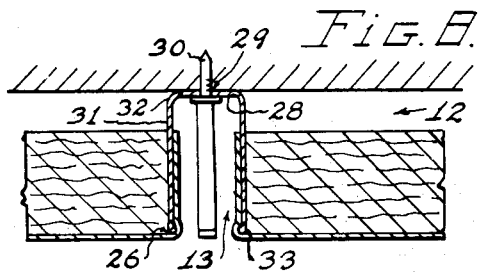
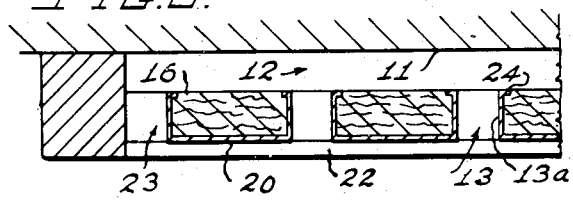
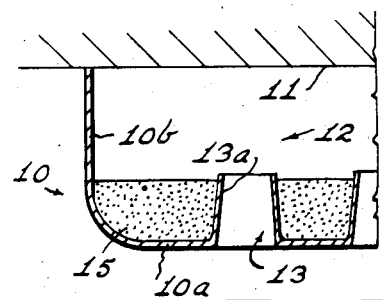
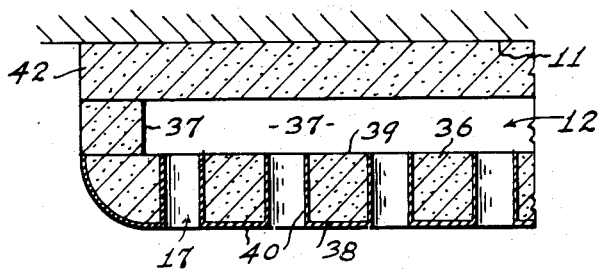
INVENTORS
Charles L. Newport
Herbert C. Smith Patented Feb. 3, 1942

2,271,871

UNITED STATES PATENT OFFICE 2,271,871

SOUND ABSORBING UNIT

Charles L. Newport and Herbert C. Smith, Los Angeles, Calif.

Application February 13, 1939, Serial No. 256,134

6 Claims. (Cl. 20—4)

Our invention has to do with acoustical treatment of rooms and, more particularly, it relates to damping and absorption of the sound waves by means utilizing the combined phenomena of diffraction and reflection.

In the art of acoustical correction, it has long been recognized that materials having the highest sound absorbing coefficient are those comprising the class of highly porous materials and materials, such as mineral wool, which is relatively loosely packed, none of which materials however, are susceptible of being practically washed or painted, which fault renders them unsuitable for constituting an exposed surface of a room. Various expedients have been attempted for concealing and supporting such materials in a manner that does not impair their sound absorbing efficiency, but so far as we are aware, all of those expedients have possessed certain rather serious faults. For instance, a common practice has been to place those materials in perforated metal pans and behind perforated self sustaining sheets of metal and other relatively dense materials, and while those expedients have been relatively successful in providing a structure which has satisfactory sound absorbing efficiency, nevertheless they have possessed the shortcoming that the sound absorbing material will fall and work through the perforations and, if the perforations be made small enough to effectively conceal the sound absorbing material, those perforations become clogged with paint during decoration or painting of the facing sheet, thus rendering them incapable of efficiently diffracting and passing the sound waves to the sound absorbing material. Also, while it has often been said of such structure that the facing material may be washed, it is a fact that if washing is attempted, an objectionable amount of moisture will pass through the perforations into the sound absorbing material. Again there are relatively non-absorptive suitably rigid materials which may not require painting or washing, which materials, by this invention may be used to entirely conceal sound absorbing material while passing sound waves thereto.

We have discovered that it is possible to overcome shortcomings of prior structures by a structure which utilizes the combined phenomena of diffraction and reflection of sound waves and, generally speaking, this is one of our major aims and accomplishments.

Another aim and accomplishment of our invention is to provide a structure in which relatively large sound wave passing perforations may be used and yet positively conceal and protect the sound absorbing material which forms the backing.

Another object is the provision of means whereby the sound absorbing material may be housed in pans or the like which have relatively greater structural strength than has heretofore been possible to obtain.

Another object is the provision of means whereby a sound wave damping chamber is provided coextensively of an exposed wall surface.

Another object is the provision of novel means for providing sound wave passageways to a sound wave damping chamber.

Another object is our novel means of directing the diffracted sound waves in such a manner that they are in turn reflected onto and absorbed by a sound absorbing material.

By thus enumerating some of the major aims and accomplishments of our invention, we of course do not wish to thereby imply that those expressed objects constitute the limits of the utilities flowing from our discovery because, from the following description of typical embodiments, it will become obvious to those skilled in the art that other important accomplishments are inherent in our invention. We also wish it understood that while in the following description we resort to considerable details of structure and combination, we do not limit our invention to such details. On the contrary, various modifications and adaptations may be made within the scope of the appended claims.

In the accompanying drawings we have illustrated some representative embodiments of our invention.

Figure 1 of the drawings is a small-scale face view of one embodiment in the form of a tile.

Figure 5 is face view of a wall or ceiling to which has been applied another form of the invention where the treatment is provided without marring the wall surfaces.

Figure 6 is a fragmentary cross section thereof.

Figure 7 is a face view showing a plurality of small size tile of another form of the invention as applied to a wall surface.

Figure 8 is a section thereof, approximately full scale, seen on line 8—8 of Figure 7.

Figure 9 is similar to Figure 2, showing a slight modification.

Figure 10 is a view showing a further variational form.

Figure 1:
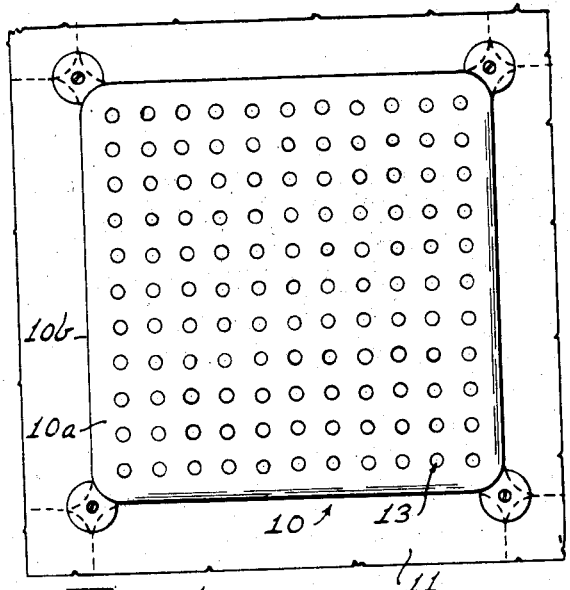

In general, we carry our invention into practice by mounting over the exposed face of a wall and in spaced relationship thereto, a durable facing member through which sound wave passageways are provided which lead from the exposed surface of the facing sheet into the chamber provided by spacing the facing sheet from the wall. As the principal sound absorbing element, we provide a filling or layer of a loosely packed or highly porous sound absorbing material between the facing sheet and the chamber. Preferably the sound wave passageways are so disposed as to direct the sound waves against the exposed wall surface from which they are reflected into the sound absorbing material, and preferably the passageways are lined with a durable and relatively non-sound-absorbing material. By virtue of such a structure, the sound absorbing material, which would otherwise constitute an unsightly mass, is positively concealed and housed from view and exposure while the sound waves generated in the room are first diffracted by the facing member, thence passed into the wave chamber where they are partially damped, thence they are reflected by the wall surface into and absorbed by the sound absorbing material.

In the forms of the invention shown in Figures 1 to 4 inclusive and 9, we provide a tile 10 in a form which may be termed a "pan" having a bottom wall 10a and the side walls 10b. This pan may be formed in any usual manner although if a loose granular material is used therein, or if the material is of a type which is apt to filter out, it is preferable that the pan be made seamless by deep drawing as though it were to retain a fluid.

This pan, when attached with its open side facing to a wall surface such as 11 coacts therewith to provide the space 12 which is hereinafter known as the "wave chamber." The wall 10a is provided with a multiplicity of suitably, and preferably evenly spaced apertures 13 which provide for sound waves moving through same so that air external to the space 10 is in direct communication with chamber 12.

Each aperture is preferably lined with metal such as 13a, which metal is preferably drawn, spun, extruded, or otherwise formed from the metal of the wall 10a. Extrusion or spinning methods are now common whereby the metal as at 13a and surrounding the aperture 13, may, in connection with the act of piercing the metal for the perforation 13, be formed into the thin tubular wall 13a having a materially greater total surface area than is represented by the area of the aperture from which this metal was displaced.

Figure 2:
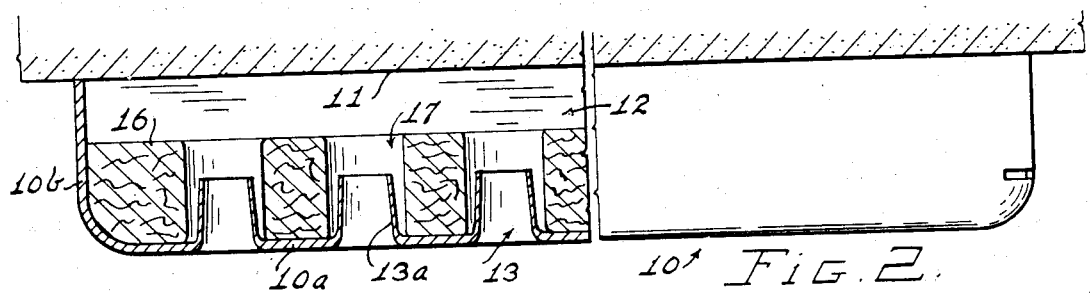
Figure 2 is a fragmentary vertical section in approximately full scale.
Figure 4:
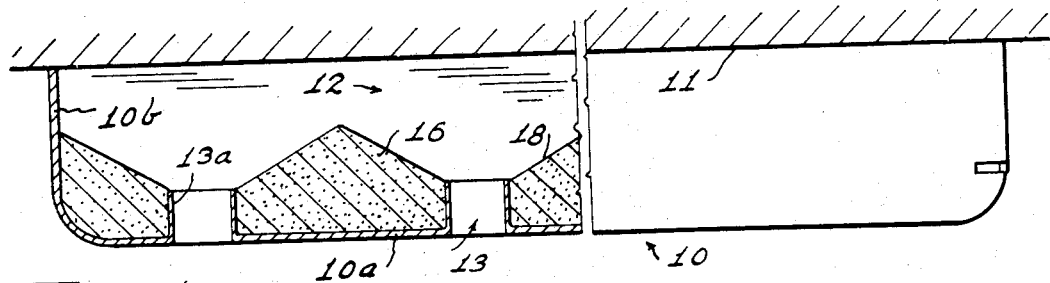
Figure 4 is a fragmentary vertical section thereof, approximately full scale.

Thus the tile provides that while there are numerous perforations leading into space 12 it is still capable of retaining, when in horizontal position, loose sand or the like as indicated at 15 in Figure 9, and is well capable in any position of both retaining and fully concealing such materials as felt or composition, indicated at 16 in Figures 2 and 4 respectively. The sound absorbing material shown in Figures 2 and 4 may be ordinary felted mineral wool with or without a slight binder, which is provided with perforations 17 extending from surface to surface thereof; one such perforation for each aperture 13.

While the metal 13a surrounding each aperture in Figures 1 and 2 may form a tube of uniform diameter throughout, and while the perforations 17 in the sound absorbing material may be shaped accordingly and the thickness of the felt limited to the depth of the metal tube 13a, we have shown the material 16 as having a greater thickness and the perforations 17 as being of greater diameter. Thus while the felt or other material 16 is fully concealed from sight at all angles of vision, and while the metal 13a fully serves to conceal, protect and retain the sound absorbing material, the said material is of substantial thickness while the perforations 17 have a greater total exposed marginal area than were the perforations 17 of a depth and shape to entirely touch the metal 13a.

Figure 3:
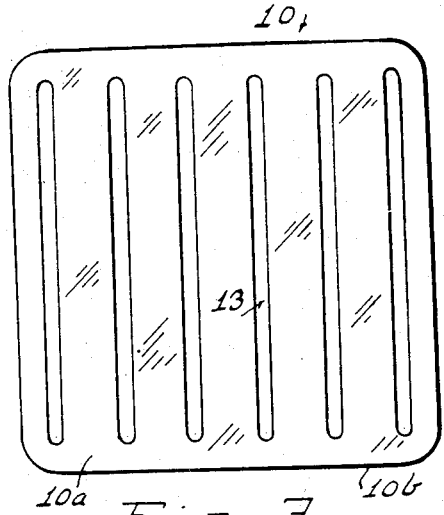
Figure 3 is a small-scale face view of another embodiment in the form of a tile and which by reason of its inherent rigidity is adapted for use in large sizes.

In the form shown in Figures 3 and 4 the shape of apertures 13 are those of greatly elongated narrow slots; the metal 13a thus acting as reenforcing elements to prevent large-area tile from sagging. Also this shape of aperture permits, in low cost practical manufacturing methods, of having the metal 13a directly right angular to wall 10a so that the slot-like apertures are of uniform width.

The sound absorbing material used in the form of tile shown in Figures 3 and 4 may be mineral wool, felt, originally plastic composition, or even loose granular material in some cases but is here shown as being a moulded composition which completely fills the lower part of chamber 12 and even extends above the walls 13a. Above the level of the metal 13a this material is moulded with inwardly diverging grooves 18; one for and alined with each aperture 13, so that a greater total surface is exposed. Naturally such composition needs very little binder as it is well protected, retained, and obscured by the metal walls 13a.

In the form of the invention shown in Figures 5 and 6 we provide imperforate channels such as 20 but these are placed in spaced parallel relationship to each other and in spaced parallel relationship to the unchanged wall surface 11 so that each adjacent pair of channels combine to provide the lined aperture 13 and the wave chamber 12 between the wall and the members 20; the wave chamber being thus in direct uninterrupted communication with the apertures 13 just as they are in the previously described embodiments.

The channels 20, as well as the pans or tile previously described are not confined to metal of course and may be moulded compositions, papiermâché, or in some cases be hollowed out of wood or built up from joined pieces of lumber. This invention, for what we believe to be the first time in the art of acoustical correction makes it possible to employ ceramic materials such as opaque glass tile, vitreous tile, or the like, the margins of the tubes being subject to glazing so that the perforations are less conspicuous. In any event the material is preferably non-absorptive or sufficiently dense to be subject to decoration, cleaning and the like and of sufficiently smooth surface texture as not to tend to accumulate or hold dust. Also, while an important function of the side walls of each aperture is to retain and conceal the sound absorbing material we believe that the physical phenomena peculiar to this invention are best realized if the walls of the apertures 13 are non-absorptive.

The channels 20 are each filled with any suitable sound absorbing material. They may be made in relatively great lengths by reason of their channel-like cross section and may be employed to span great distances, such as the full height of a wall or the full width of a ceiling or side wall. In the particular embodiment shown in Figure 5 they may have open ends (not shown) since the moulding or frame 22 acts to close the ends. The moulding or frame is formed with a deep rabbet 23 in which the ends of the channels are extended so that a single rectangular frame such as 22 will hold a plurality of properly spaced parallel channels and thus provide a complete sound absorbing panel which when attached to a wall will hold all of the channels in proper spaced relationship to the wall surface. The panel shown in Figure 5 may be of moderate area so that several such panels may be arranged to give various patterns, or the panel may be constructed in situ to cover an entire wall or ceiling without any intermediate supports for said channels and so as to give a large coextensive single wave chamber 12. By providing each channel with slightly inturned edges 24 they may be shipped and handled with mineral wool felt or the like in place and the edges 24 will provide for using any of a great variety of fastening means for holding the channels in spaced relationship to a wall and as a substitute for the frame.

Thus, in Figures 7 and 8 we show clips 25 by which channels, box-like tile or the like may be held in spaced relationship to each other and to a wall surface. As an example of the many modifications which this invention will suggest to the minds of those skilled in the art we have shown such clips used in connection with small common tin boxes, to carry out this invention. Boxes of this type are readily made with an internal outwardly directed groove 26 around all sides thereof and in slightly spaced relationship to the innermost edge. Such boxes are readily filled with originally plastic sound absorbing material, or with precut pieces of felt, or the like. In the case of mineral wool they are filled particularly easily by merely inverting each box over a mass of wool and using the box edge as a "biscuit-cutter" to cut out the required amount of wool, which latter expands sufficiently when pressure is released, to become suitably lodged in the interior of the box.

The clip shown herein is of light metal or wire construction and includes a central disc-like body 28 provided with an aperture 29 for a nail, screw or the like 30. Each is provided with four prongs 31 radial to or integral with the body, bent as at 32 at right-angle thereto to extend the proper distance from the ceiling or wall to which the body is attached as shown. Each end of each prong is then formed as at 33 to snap into the corresponding part of the groove of the adjacent box.

It will be found that a workman may quickly divide a wall area into a checkerboard pattern of intersecting longitudinal and transverse lines or marks such as 34 and where each intersection occurs a clip can be quickly placed. Obviously the shape of the clip is such that with the nail head in place it will fit over the end of any suitable instrument such as a nail-punch and a single hammer blow will drive the nail home and secure the clip in its proper place on a wall or ceiling. Then by placing each tile so that it engages the corresponding prong of each of four corresponding clips, the tile are quickly applied over an entire wall and the wall is thus provided with a substantially co-extensive spaced covering of metal or the like held in spaced relationship to the wall surface and providing a plurality of deep apertures each lined by this non-absorptive material and communicating directly with the wave chamber.

It will be apparent now that particularly where the wall surface is of a highly reflective type, the wave chamber provided by this invention is lined in opposition to the wall surface with highly effective sound absorbing material.

It may simply be said that sound waves striking the non-absorptive outer surfaces of the tile, channels or the like will pass through the openings to the wave chamber and convey practically all of their energy into the chamber. In fact it is generally conceded that openings of the nature and spacing indicated will by the phenomenon of diffraction, transmit 90% or more of their energy through the perforations and only a negligible amount of sound will be reflected directly from the reflective surface. Also the sound entering chamber 12 is largely absorbed by reason of the great mass and exposed surface area of sound absorbing material therein.

However, such explanation does not do the invention justice for there are other advantages. Aside from structural, decorative and hygenic considerations the dense material, which is relatively non-absorptive, is of course not entirely unresponsive to the impact of waves, particularly those of low frequency, and the exposed surface of each tile or channel is to some extent a diaphragm. By this invention such diaphragm is damped by the contact of the loose or cellular material and this produces some absorption which the wave chamber is not directly responsible for. The higher frequency waves readily pass through the apertures or, possibly we should say readily transmit their energy through the apertures into the chamber to there set up secondary waves which are partially absorbed and which have little energy left to retransmit back to the air of the room.

At this point it will be seen that the explanation for the phenomena involved varies with conditions but those skilled in the art, without further explanation, will understod that this invention provides concealed, protected, sound absorbing material which while concealed is still within the confines of the walls of the room and so distributed and in such relatively direct communication with the room as to be subject to all of the energy generated in the room and in such pressure responsive contact with the complete air mass of the room as to be peculiarly effective.

Size and spacing of aperture, co-efficients of the material used, and distance from wall surface or depth of chamber 12, and depth to which it is filled, respectively, may be employed in various combinations to give various performance curves throughout given frequency ranges.

In all of the embodiments shown the sound absorbing material is totally concealed at all angles of vision and the otherwise delicate margins of perforations such as 17 are amply protected from abrasion.

In the form shown in Figure 10, the sound absorbing material is indicated at 36 and in this form is largely self-supporting and may comprise a board of the common sound absorbing types. This board is provided with spacers such as 37, 37, for holding it in spaced relationship to a wall or ceiling surface to form the wave chamber 12 therebetween. The board 36 is provided with a plurality of apertures 17 which extend from the outer surface 38 to the inner surface 39. In the manufacture of this product the margins of the apertures as well as the entire outer surface 38 is covered with a co-extensive coating 40 impervious to air and preferably of a nature to increase the rigidity of the board. Also this coating is decorative and preferably water repellent. It may be any of the well known metal-powder paints, heavy enamels or the like.

The coating may be applied in various well known manner although we have found that if two boards are jointly dipped in a fluid coating with their surfaces 39 in abutment with each other, all required surfaces will become coated and surface 39 of each board will remain uncoated. The surface 39 becomes the sound absorbing surface in the wave chamber 12, while the coating serves to conceal and protect all exposed areas of the board and while the margins of the apertures are non-absorbent these apertures lead directly to the wave chamber. The wall surface may be supplied as shown in Figure 10 with an absorbent surface material 42 which adds to the absorbent surface of the wave chamber, or this material 42 may be attached first to the spacers 37 so as to form a complete article of manufacture.

This application is a continuation in part of our previously filed and copending application Serial Number 145,767, filed June 1, 1937.

We claim:

1. An acoustical structure comprising, in combination with the wall surface of a room, a frame positioned over the exposed surface of the wall, a plurality of parallel elongated imperforate non-absorptive channel members carried by the frame and disposed in parallel relationship to and spaced from the exposed surface of the wall to provide a sound wave chamber co-extensively over the exposed surface of the wall, said channel members opening into the chamber and being spaced apart to provide passageways therebetween through which sound waves may pass from the room into the chamber, the side walls of said channel members forming a lining for the passageways, and a filling of sound absorbing material carried in the channel members opposite the chamber.

2. The combination of claim 1 in which said channel members are comprised of a durable and substantially non-sound absorptive material.

3. The combination of claim 1 in which said channel members are comprised of metal.

4. In combination with a wall surface, dense non-absorptive sheet material in spaced parallel relationship thereto and providing respectively a dense non-absorptive outer or exposed surface parallel to the wall and deep apertures normal to the wall lined by the dense non-absorptive material and leading from said exposed surface directly into the space between the said material and the wall, and sound absorbing material in said space obscured jointly by the material forming the said surface and the material lining the apertures; said sheet material throughout said exposed surface and where it lines the apertures being imperforate and relatively non-absorptive whereby all sound energy reaching said space does so by diffraction through said apertures prior to absorption.

5. In combination with a wall surface, sheet metal in spaced parallel relationship thereto and providing respectively a metal outer or exposed surface and deep metal-lined elongated apertures leading from such surface directly into the space between the metal surface and wall, and sound absorbing material in said space obscured jointly by said metal surface and the metal lining the apertures; said sheet material throughout said exposed surface and where it lines the apertures being imperforate and relatively non-absorptive whereby all sound energy reaching said space does so by diffraction through said apertures prior to absorption.

6. In combination with a wall surface of a room, a frame secured to said wall and encompassing a given area, a plurality of independent disconnected strips supported at the ends by said frame in spaced parallel relationship to each other and in spaced parallel relationship to said wall surface whereby there is provided within said frame and between said strips and said wall surface a wave chamber co-extensive of said area and having direct communication through the spaces between said strips with a source of sound in said room; each strip comprising a relatively non-absorption imperforate channel having respectively an exposed outer surface and spaced side walls, and sound absorbing material exposed to said wave chamber contained within, and fully obscured by, said channels.

CHARLES L. NEWPORT.
HERBERT C. SMITH.